S. M. DICK.
METHOD OF MAKING COMPOSITION BUTTER.
APPLICATION FILED JAN. 8, 1917.
1,258,996.
Patented Mar. 12, 1918.
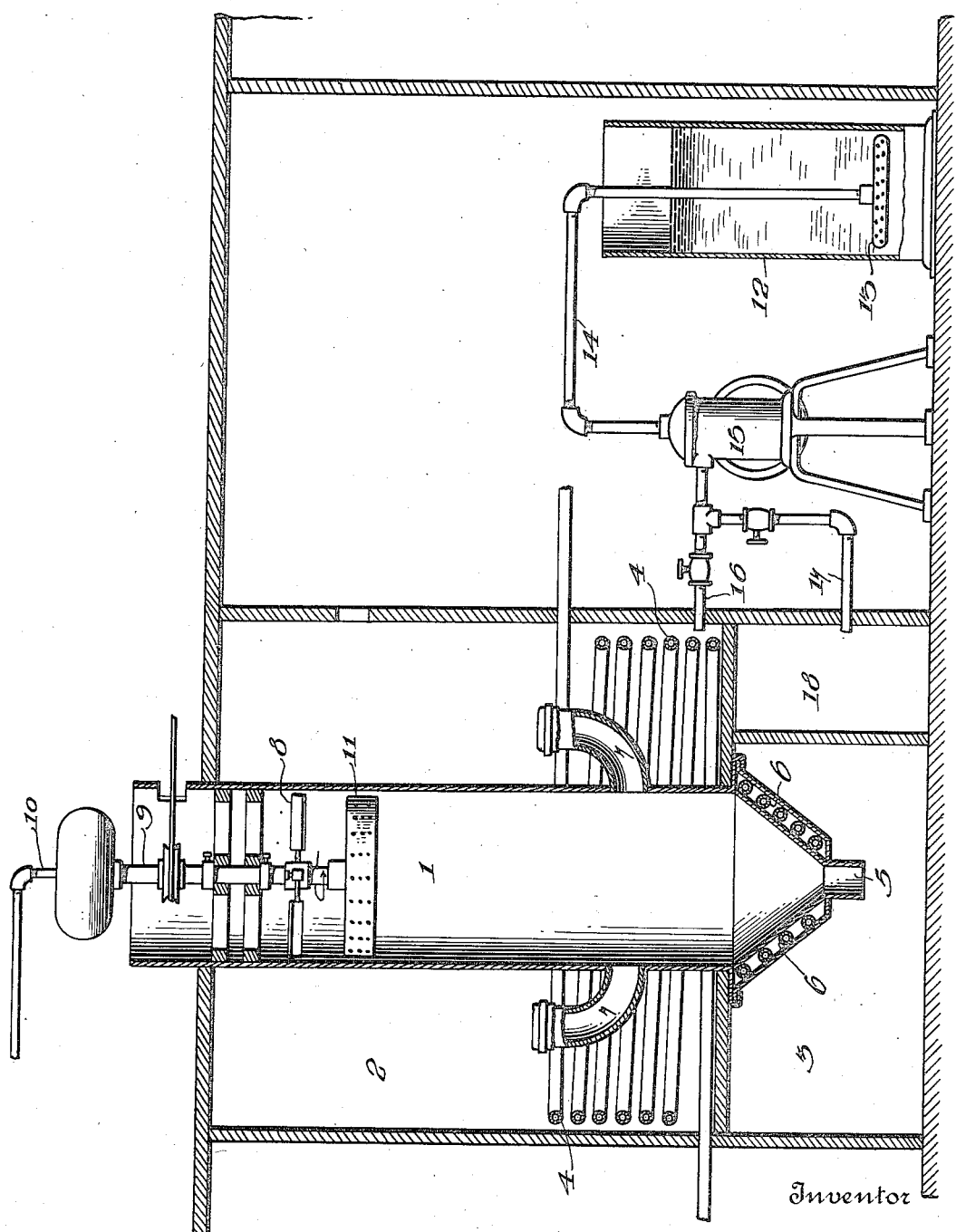
Witness
H. Woodard
Inventor
Samuel M. Dick
By H. B. Willson & Co.
Attorneys

UNITED STATES PATENT OFFICE.

SAMUEL M. DICK, OF MINNEAPOLIS, MINNESOTA, ASSIGNOR OF ONE-HALF TO FRANCIS E. MICK, OF MINNEAPOLIS, MINNESOTA.

METHOD OF MAKING COMPOSITION BUTTER.

1,258,996.  Specification of Letters Patent.  Patented Mar. 12, 1918.

Application filed January 8, 1917. Serial No. 141,296.

*To all whom it may concern:*

Be it known that I, SAMUEL M. DICK, a citizen of the United States, residing at Minneapolis, in the county of Hennepin and State of Minnesota, have invented certain new and useful Improvements in Methods of Making Composition Butter; and I do declare the following to be a full, clear, and exact description of the invention, such as will enable others skilled in the art to which it appertains to make and use the same.

My invention which relates to the manufacture of composition butter has for its object to provide an improved method whereby the required ingredients may be condensed quickly yet effectively and with this general object in view, the invention resides in the several steps hereinafter fully described and claimed.

In the accompanying drawing is shown a vertical section of the apparatus preferably employed in carrying out the improved method.

Before describing the method it will be well to briefly define the apparatus employed and to this end reference may be had to the accompanying drawing. In this drawing the numeral 1 designates a vertically disposed tubular casing extending through a hot air chamber 2 into a work room 3, said chamber being heated by a hot water or steam coil 4 or by any other preferred means. The lower end of the casing 1 is funnel-shaped and is provided with an outlet 5, said end preferably having a cooling coil 6 through which cold water, ammonia or the like is circulated.

Hot air inlets 7 open from the chamber 2 into the casing 1 and a fan 8 is provided in the upper portion of this casing for drawing a current of hot air through the latter from said inlets, said fan being mounted on a rotating hollow shaft 9 having an inlet pipe 10 at its upper end and a centrifugal atomizer 11 on its lower end. The atomizer serves to break up the liquid fed to the apparatus through the hollow shaft 10 and the hot air currents induced by the fan 8 carry off the required amount of moisture so that the condensed product flows into the lower end of the casing 1 and is here cooled and more or less congealed by the coil 6 before being discharged through the outlet 5.

On the exterior of the chambers 2 and 3 or at any other preferred location is a receptacle 12 having in its lower end an air spraying device 13 supplied with air at any temperature by a pipe 14 leading to a pump 15 which may be operated in any suitable manner. A valved hot air inlet pipe 16 leads to the pump 15 from the hot air chamber 2 while another valved pipe 17 leads to said pump from a refrigerator or cold air chamber 18 which is by preference located in the work room 3. A screen (not shown) will in most cases be disposed over the inlet end of the pipe 14 so as to prevent any possibility of foreign matter entering the receptacle 12 in which the condensed product is aerated.

From the foregoing, the general construction of the apparatus will be clear and I will therefore proceed with a description of the method carried out by the same. Fresh milk is separated in the usual manner into cream and skimmed milk and the latter is then fed to the apparatus through the inlet pipe 10. The atomizer 11 now sprays this skimmed milk into the casing 1 by centrifugal force and the rotating fan 8 induces a current of hot air through the vapor thus formed to remove a predetermined quantity of the moisture so that the condensed skimmed milk falls into the lower end of the casing and is more or less congealed by the action of the coil 6, being then removed through the outlet 5. If a greater per cent. of moisture is to be removed, the residue may be retreated by again carrying it through the apparatus or another casing 1 (not shown) may be employed for this purpose as will be seen by reference to my U. S. application, Serial No. 138,879 filed Dec. 26, 1916.

The condensed skimmed milk when removed from the apparatus after being properly treated, is mixed in any required proportion with the sweet cream and this mixture of cream and condensed milk is fed through the apparatus the required number of times so that it is condensed to the proper consistency. It is then placed in the receptacle 12 and aerated with air at any suitable temperature supplied by the pump 15, the temperature of this air being controlled by proper manipulation of the valves of the pipes 16 and 17. Aeration of the compound not only effectively agitates the same to insure a thorough mixing of the butter fat and the milk solids but removes still more moisture so that the final product is of the required density. This product is removed from the receptacle and is washed, worked and salted in the usual or any preferred manner.

The complete product is practically indistinguishable from the best grades of butter yet the milk solids are utilized in addition to the butter fat. The proportions of butter fat, milk solids and moisture may be varied as occasion may demand but the edible qualities of the product are not noticeably changed.

I claim:—

1. The method of making a butter-like mass consisting in condensing a mixture of sweet cream and sweet milk to a buttery consistency.

2. The method of making a butter-like mass consisting in condensing a mixture of sweet cream and sweet milk to a buttery consistency by spraying it into heated air.

3. The method of making a butter-like mass consisting in condensing a mixture of cream and condensed skimmed milk to a buttery consistency.

4. The method of making a butter-like mass consisting in condensing a mixture of cream and condensed skimmed milk to a buttery consistency by spraying the mixture into heated air.

5. The method of making a butter-like mass from milk, consisting in separating the milk, condensing the skimmed milk and then spraying the condensed skimmed milk mixed with the cream into heated air in a manner to condense the mixture to a buttery consistency.

6. The method of making artificial butter consisting in mixing fresh condensed milk and fresh cream in suitable proportions, atomizing the mixture in a heated passage and throwing it in a film across said passage, passing a current of heated air longitudinally through said passage and film to remove the moisture from the latter to permit the solids to settle in said passage, and then chilling and removing said solids.

7. The method of making artificial butter consisting in mixing fresh condensed milk and fresh cream in suitable proportions, atomizing the mixture in a vertical passage surrounded by a hot air chamber and at the same time throwing it in a film across said passage, passing a current of hot air from said chamber vertically through said passage to remove the moisture from said film to permit the solids to drop to the lower end of said passage, and then chilling and removing said solids.

In testimony whereof I have hereunto set my hand in presence of two subscribing witnesses.

SAMUEL M. DICK.

Witnesses:
J. R. LEAK,
M. P. LEAK.